United States Patent [19]
Butler et al.

[11] Patent Number: 5,564,271
[45] Date of Patent: Oct. 15, 1996

[54] PRESSURE VESSEL FUEL NOZZLE SUPPORT FOR AN INDUSTRIAL GAS TURBINE ENGINE

[75] Inventors: Aaron S. Butler, Ledyard; Thomas J. Madden, Vernon; Robert W. Soderquist, Windsor; Dennis J. Sullivan, Vernon, all of Conn.

[73] Assignee: United Technologies Corporation, Hartford, Conn.

[21] Appl. No.: 267,102

[22] Filed: Jun. 24, 1994

[51] Int. Cl.⁶ .................................................. F02C 3/14
[52] U.S. Cl. .......................................... 60/39.31; 60/740
[58] Field of Search .................................. 60/39.31, 740, 60/742, 738, 261, 737, 748

[56] References Cited

U.S. PATENT DOCUMENTS

| | | | |
|---|---|---|---|
| 2,959,003 | 11/1960 | Carlisle et al. | 60/742 |
| 3,690,093 | 9/1972 | Carlisle | 60/742 |
| 4,735,044 | 4/1988 | Richey et al. | 60/742 |
| 4,854,127 | 8/1989 | Vinson et al. | 60/748 |
| 5,218,824 | 6/1993 | Cederwall et al. | 60/737 |
| 5,269,468 | 12/1993 | Adiutori | 60/740 |
| 5,307,634 | 5/1994 | Hu | 60/737 |

FOREIGN PATENT DOCUMENTS 132213  1/1985  European Pat. Off. ............. 60/740

Primary Examiner—Timothy S. Thorpe

[57] ABSTRACT

A support structure for a low $NO_x$ industrial gas turbine engine fuel nozzle includes a pressure vessel which forms an interior cavity such that the exterior of the pressure vessel is exposed to the high pressure and temperature of the compressor outlet while the interior cavity of the pressure vessel is exposed to ambient conditions. The fuel lines to the nozzle run through the interior cavity of the pressure vessel, isolated from the high temperatures and pressures at the compressor outlet. The pressure vessel housing and the ambient air within the housing act as natural insulators which prevent the fuel lines from becoming too hot and coking. The support structure also facilitates maintenance of the combustor section of the engine since the low $NO_x$ fuel nozzle and the annular combustor assembly of the engine are easily accessible for maintenance.

8 Claims, 6 Drawing Sheets

PRESSURE VESSEL FUEL NOZZLE SUPPORT FOR AN INDUSTRIAL GAS TURBINE ENGINE

TECHNICAL FIELD

This invention relates to gas turbine engines, and more particularly to a fuel delivery system for an industrial gas turbine engine.

CROSS REFERENCE TO RELATED APPLICANTS

This application contains subject matter related to co-pending patent application Ser. No. 08,265,588, entitled "Pilot Injector for Gas Turbine Engines", filed even date herewith.

BACKGROUND ART

Achieving low emissions of oxides of nitrogen ($NO_x$) without the use of water is the subject of a considerable amount of research and development in the gas turbine industry. $NO_x$ is an ingredient of smog, and environmental regulations are increasingly strict in limiting its emissions worldwide. Several frame type gas turbine manufacturers have begun guaranteeing 25 parts per million (PPM) $NO_x$ or lower, some even as low as 9 PPM while using natural gas, without the use of water. This compares with $NO_x$ levels in excess of 100 PPM that were routine throughout the industry in the 1970s. The gas turbine emission regulations most widely used in the United States now require 25 PPM using natural gas fuel.

It is more difficult to achieve low $NO_x$ in a typical aeroderivative industrial gas turbine as compared to a frame type gas turbine since one is limited to starting with an existing design rather than an entirely new design. $NO_x$ is formed as a result of high temperature in the flame zone of the combustor. The higher pressure ratios in an aeroderivative gas turbine give them an efficiency advantage over frame type gas turbine in simple cycle applications, but the higher operating pressure creates higher air temperatures at the combustor inlet. The cycle tends to produce more $NO_x$ because of the higher flame temperatures. Also the compactness of aeroderivatives makes it more difficult to design hardware to reduce the flame temperature.

In developing dry low $NO_x$ combustors, all manufactures are premixing some combustion air with the fuel, resulting in a cooler flame. The trick is to design the premixing system so that it not only does the job at full power, but also works at part load and can accommodate transients, such as sudden decreases of load, without a engine flameout. In order to have low emissions of other pollutants, such as carbon monoxide, smoke and unburned hydrocarbons, the flame cannot be too cool, and the combustion process cannot leave pockets of incomplete combustion. Considering all the constraints, the development of a successful dry low $NO_x$ combustion system requires considerable effort.

Along with developing a premix nozzle which meets these requirements a support structure is required for the low $NO_x$ fuel nozzle. The support structure must be sufficiently rigid to withstand the vibrations of the high speed turbo machinery, acoustic excitation, aerodynamic pressure loads, and the high temperatures at the compressor outlet (e.g., about 850° F.). In addition, the support structure must also house the fuel lines to the low $NO_x$ nozzle and provide sufficient insulation to the liquid line to prevent coking of the liquid fuel due to the high temperature.

DISCLOSURE OF THE INVENTION

An object of the present invention is to provide a support structure for an industrial gas turbine low $NO_x$ fuel nozzle which prevents coking of the liquid fuel.

Another object of the present invention is to provide a support structure which allows easy access to the low $NO_x$ mixing nozzles and more particularly to the bolts connecting the support structure to the center body cone of the fuel nozzle.

According to the present invention, a pressure vessel support structure having an elbowed oval vessel housing which forms an interior cavity is inserted into a recess of the industrial gas turbine engine, a fuel distribution manifold is attached to the elbowed oval vessel at the outer downstream end of the vessel housing along with a mount support structure to which the low $NO_x$ mixing nozzle is securely mounted, a fuel line enters the upstream end of the vessel housing and runs through the interior cavity and connects to the fuel distribution manifold, such that, the fuel line is isolated from the harsh temperature and pressure conditions at the compressor outlet.

According to another aspect of the present invention, a low $NO_x$ fuel nozzle system includes an annular combustor within which the lean fuel air mixture from a plurality of low $NO_x$ fuel nozzles enters and is ignited, each low $NO_x$ fuel nozzle assembly includes a support structure and a nozzle wherein the support structure is a pressure vessel the interior of which is at the ambient conditions while the exterior of the pressure vessel housing is at the compressor exit conditions.

The present invention employs a novel support structure for use in an industrial low $NO_x$ gas turbine engine. Since the fuel lines run within the pressure vessel isolated from the high temperature and pressure conditions of the compressor outlet, the pressure vessel housing and the ambient air within the housing act as natural insulators which prevent the fuel lines from becoming too hot and coking.

The present invention also facilitates maintenance of the combustor section of the engine since the low $NO_x$ fuel nozzle and the annular combustor assembly of the engine are easily accessible for maintenance.

These and other objects, features and advantages of the present invention will become more apparent in light of the following detailed description of a preferred embodiment thereof, as illustrated in the accompanying drawings.

BEST MODE FOR CARRYING OUT THE PRESENT INVENTION

Figure 1:
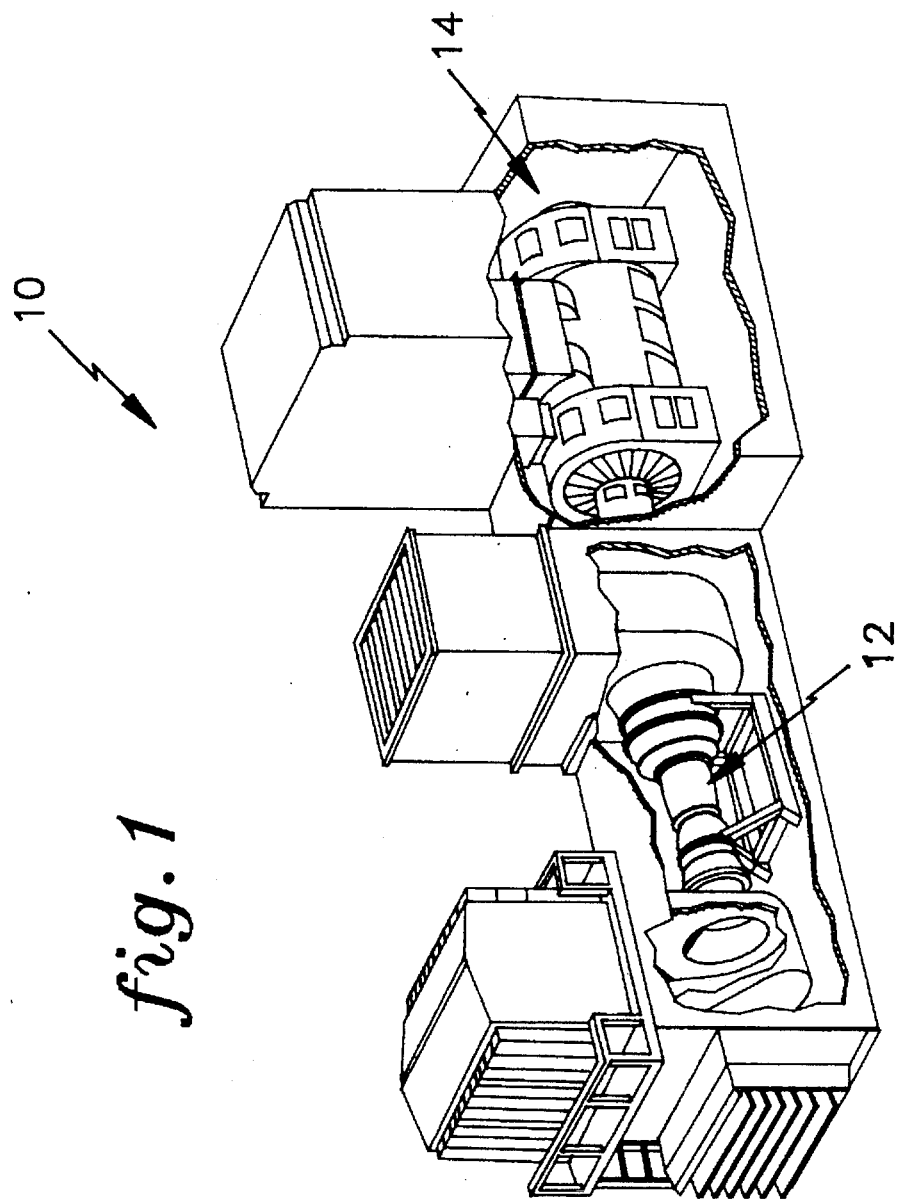
FIG. 1 is an illustration of a co-generation system which includes an industrial gas turbine engine.

FIG. 1 is an illustration of a co-generation system 10 which includes an industrial gas turbine 12 that drives a generator 14. The generator 14 can be used to drive local electrical needs or connected to a power grid and networked. However, the industrial gas turbine engine is not limited to driving an electrical generator; the gas turbine can also be used to drive other types of loads.

Figure 2A:
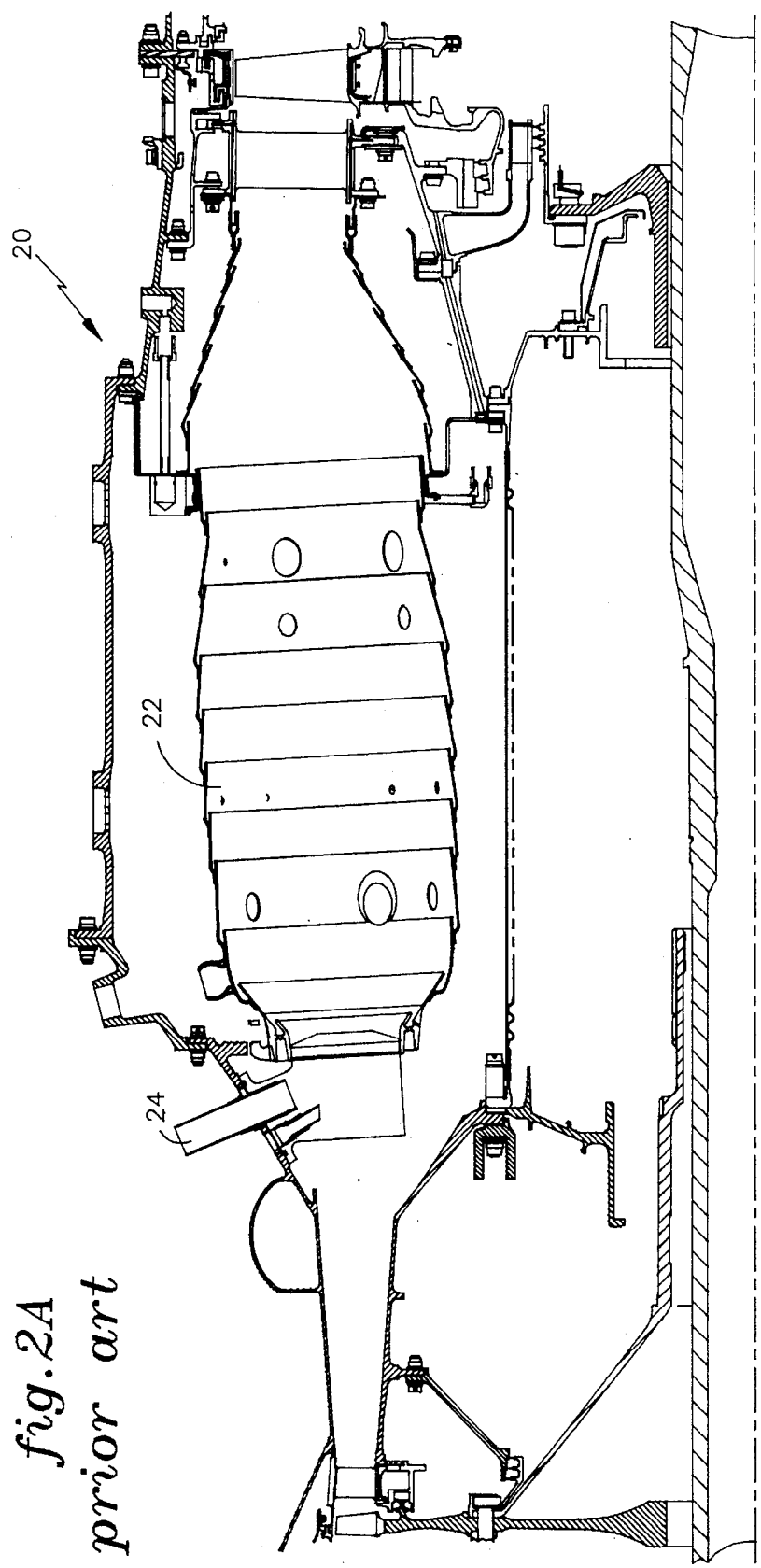
FIG. 2A is an illustration of a cross sectional view of a portion of a prior art industrial gas turbine engine on the top half of the drawing.

FIG. 2A illustrates a cross sectional view of a portion of a prior art industrial gas turbine engine 20. The prior art gas turbine includes a plurality of combustor cans 22 (only one is shown) which radially surround the engine. Fuel is injected to the combustor can 22 by a fuel nozzle 24 and continuously ignited within the can to release energy. This prior art design is a flow down from aircraft engine technology and is generally incapable of meeting the low NO$_x$ requirements of modern industrial gas turbine engines.

Figure 2B:
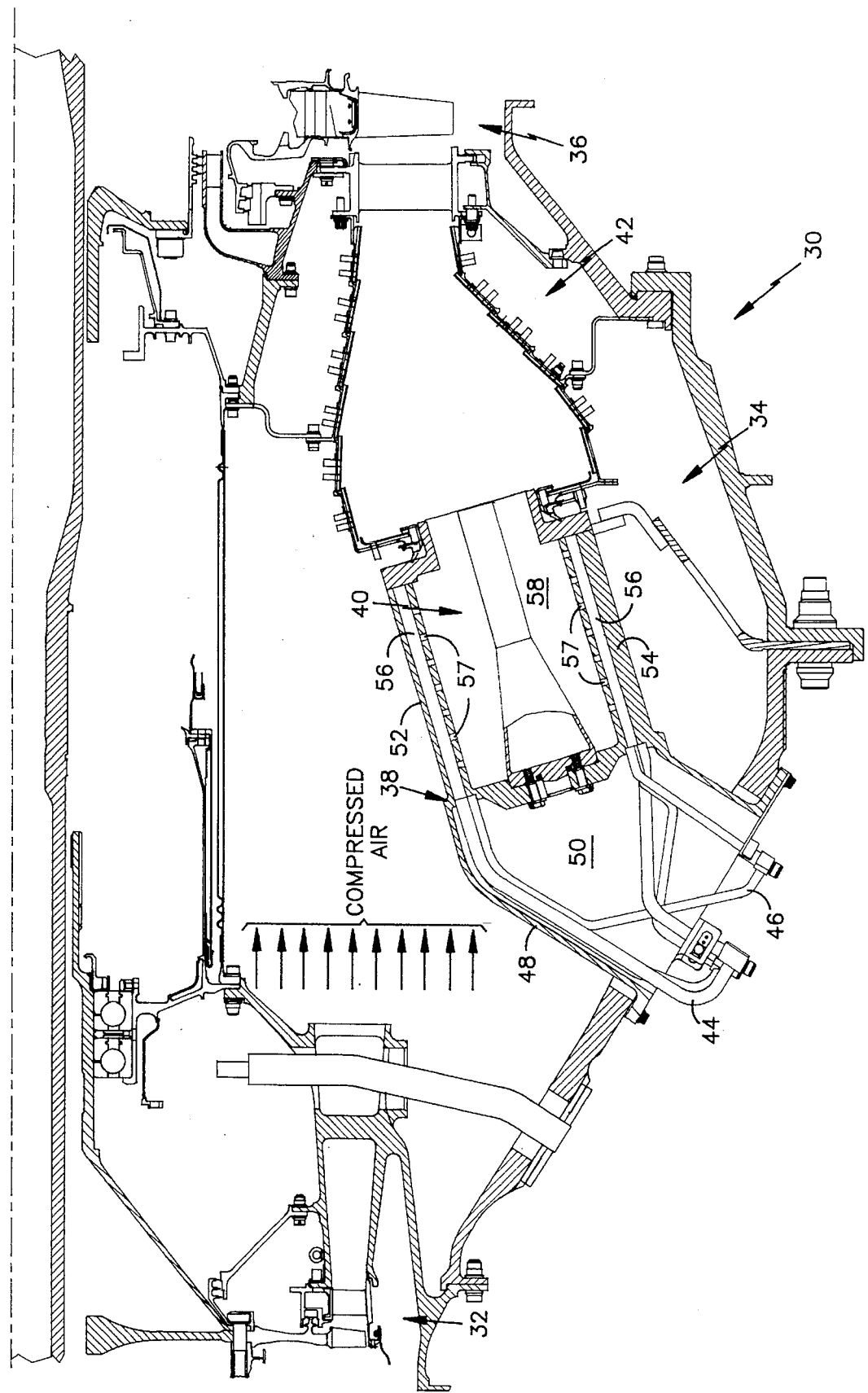
FIG. 2B is a cross sectional view of a portion of an improved low $NO_x$ industrial gas turbine of the present invention having a pressure vessel support structure for a low $NO_x$ nozzle.

FIG. 2B illustrates a portion of a cross sectional view of a low NO$_x$ industrial gas turbine engine 30 according to the present invention. This engine 30 includes a compressor 32, a dry low NO$_x$ combustion section 34 and turbine 36. The dry low NO$_x$ combustion section 34 includes a pressure vessel support structure 38 and a fuel air mixing nozzle 40 which provides a lean fuel air mixture to an annular combustor 42. The engine 30 actually includes a plurality of pressure vessel support structures and fuel air mixing nozzles. However, for ease of illustration of the present invention, only a single pressure vessel support structure and fuel nozzle combination are shown. As an example, the gas turbine 30 may contain sixteen fuel air mixing nozzles radially around the engine which each provides a lean fuel air mixture into the annular combustor 42. The low NO$_x$ gas turbine 30 receives fuels (e.g., natural gas and jet fuel) via tubes 44,46 respectively which run through the interior cavity 50 of the pressure vessel support structure 38. Each fuel is routed through the interior cavity 50 formed by an elbowed oval vessel wall 48 to the mixing nozzle 40. The vessel wall 48 has a thickness on the order of 0.100 to 0.500 inches, with a preferable thickness of about 0.200 to 0.250 inches. The exterior portion of the pressure vessel wall 48 is exposed to compressor outlet conditions (e.g., 850° F. and 300 psi) while the interior cavity 50 of the pressure vessel is at local ambient conditions. Hence, the term pressure vessel due to the pressure gradient across the walls 48. The pressure vessel may be formed of a nickel alloy such as INCO-625 or AMS-5401. Other material choices include a high strength stainless steel, cobalt alloys, C230, Russian EP648, titanium or INCO-718. An advantage of the pressure vessel support structure 38 is that the liquid fuel line 46 can be uninsulated since the 147 fuel line is no longer exposed to the high temperatures of the compressor outlet. Therefore, coking of the fuel lines is prevented since the lines are now exposed only to the benign ambient conditions within the interior cavity 50.

Figure 3:
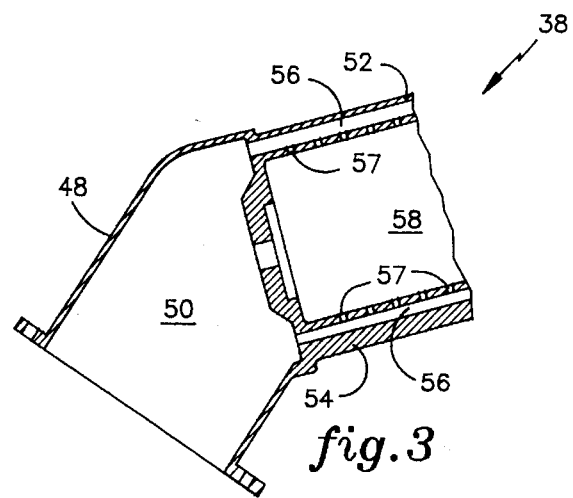
FIG. 3 is a cross sectional view of the pressure vessel support structure.

Along with the pressure vessel walls 48 the pressure vessel support structure also includes two fuel distribution manifolds 52,54 to which the fuel lines 44,46 connect. Each manifold 52,54 includes a lengthwise fuel passage port 56 through which the fuel flows and exits through a plurality of outlet ports 57 to a chamber 58 where the fuel mixes with the compressed air to form a lean fuel air mixture which is ignited in the annular combustor 42. The pressure vessel support structure 38 is preferably machined from a single piece to form an integral support structure. However, the support structure may also be several different pieces. As an example, the structure may include separate pieces such as the pressure vessel walls 48, and the distribution manifolds 52,54 which can be attached to form the entire support structure. The draw back to this type of design however is that since natural gas may be used in the system, the separate piece construction leads to additional complexity such as well sealed connections to ensure all the gas running through the fuel lines enters the distribution manifolds. FIG. 3 illustrates as example of the pressure vessel support structure formed from a single piece construction.

Figure 4:
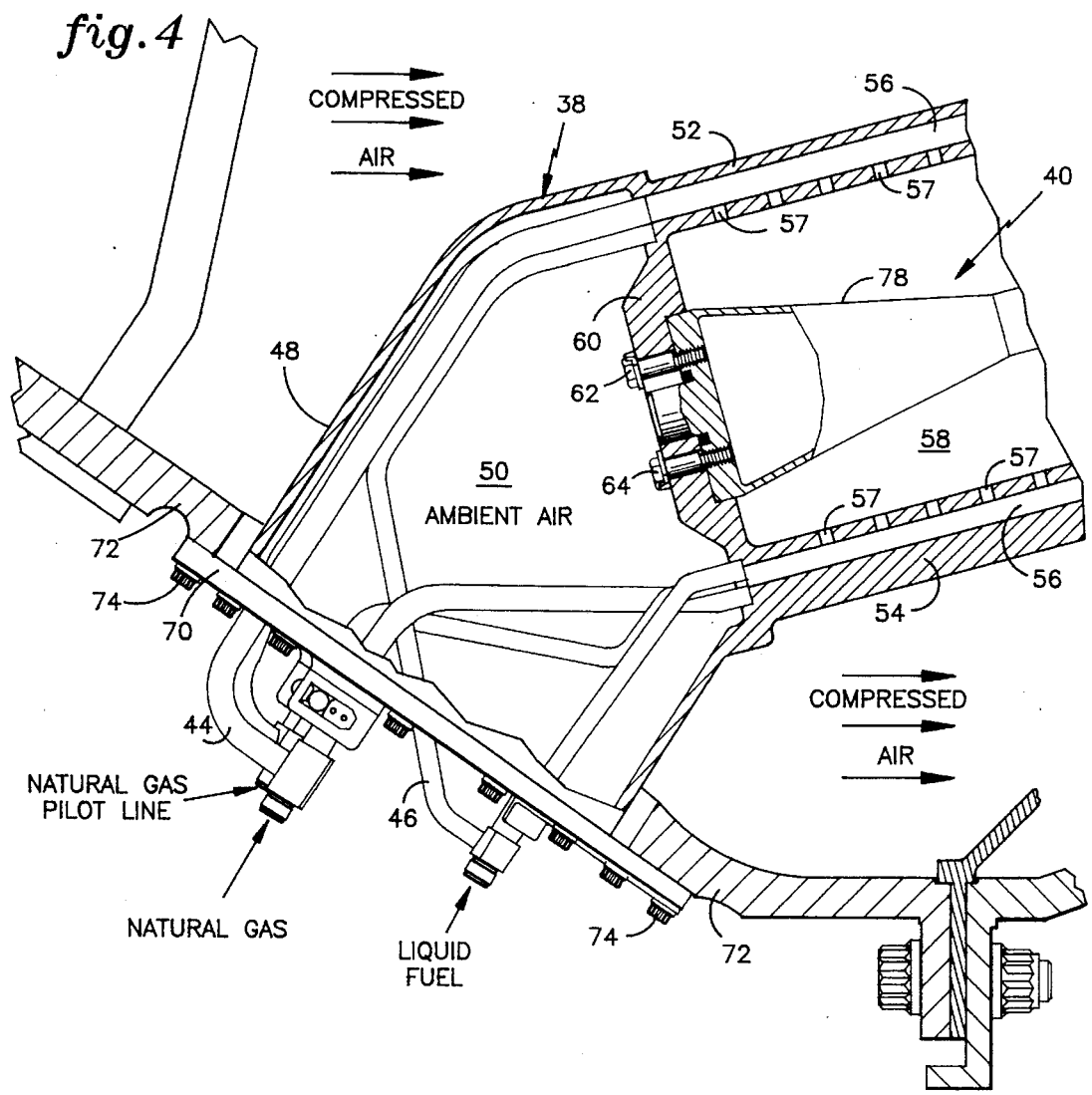
FIG. 4 is a more detailed view of a cross sectional portion of the pressure vessel connected to the engine casing and supporting the low $NO_x$ fuel nozzle.

FIG. 4 illustrates a more detailed cross sectional view of the pressure vessel support structure 38 and the fuel lines 44,46 running through the interior cavity 50. The pressure vessel 38 further includes a mount structure 60 which is connected in a sealed manner to the nozzle center body by bolts 62,64. An example of a low NO$_x$ nozzle is disclosed in commonly assigned U.S. Pat. No. 5,307,634 entitled "Premix Gas Nozzle". The pressure vessel also includes a ranged base 70 which is securely connected to the engine casing 72 by a plurality of bolts 74.

Figure 5:
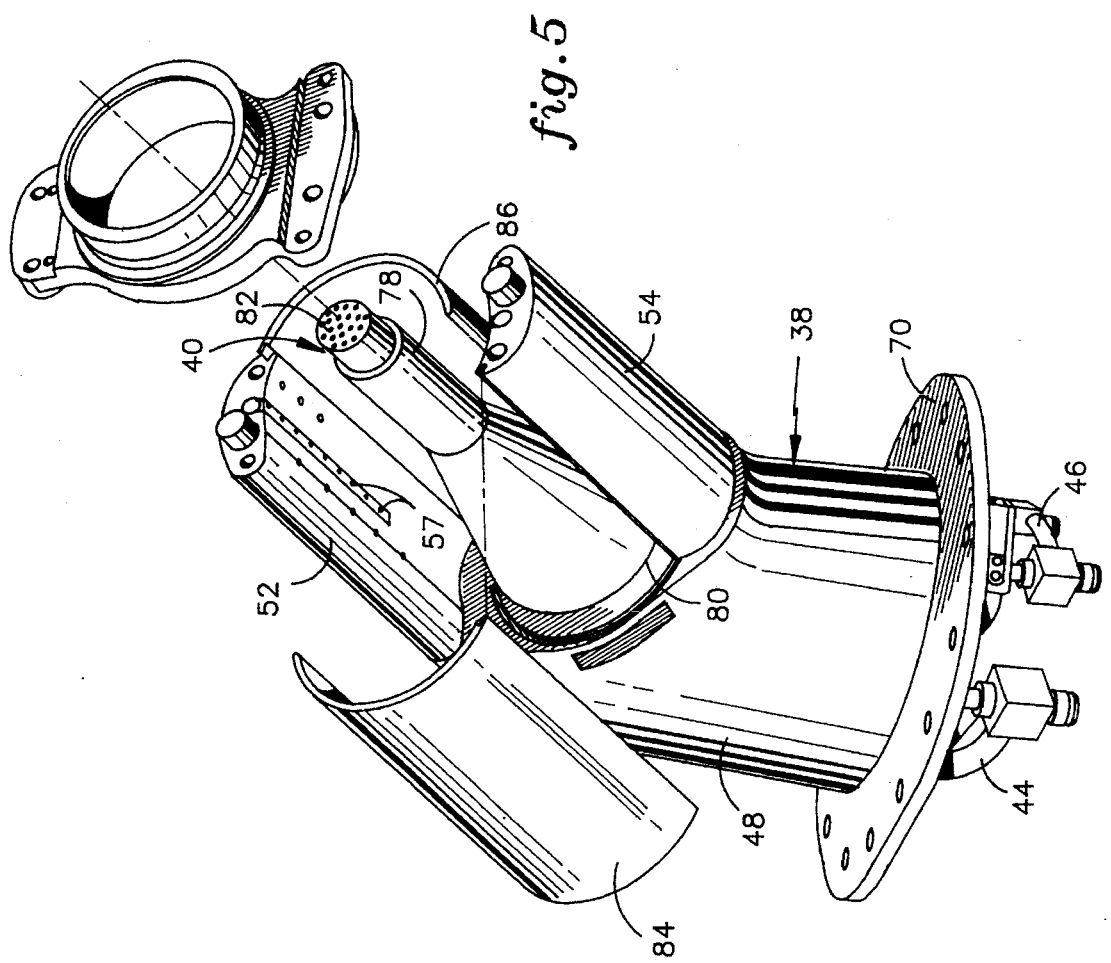
FIG. 5 is an illustration of the pressure vessel support structure of the present invention supporting the low NO$_x$ fuel nozzle.
Figure 6:
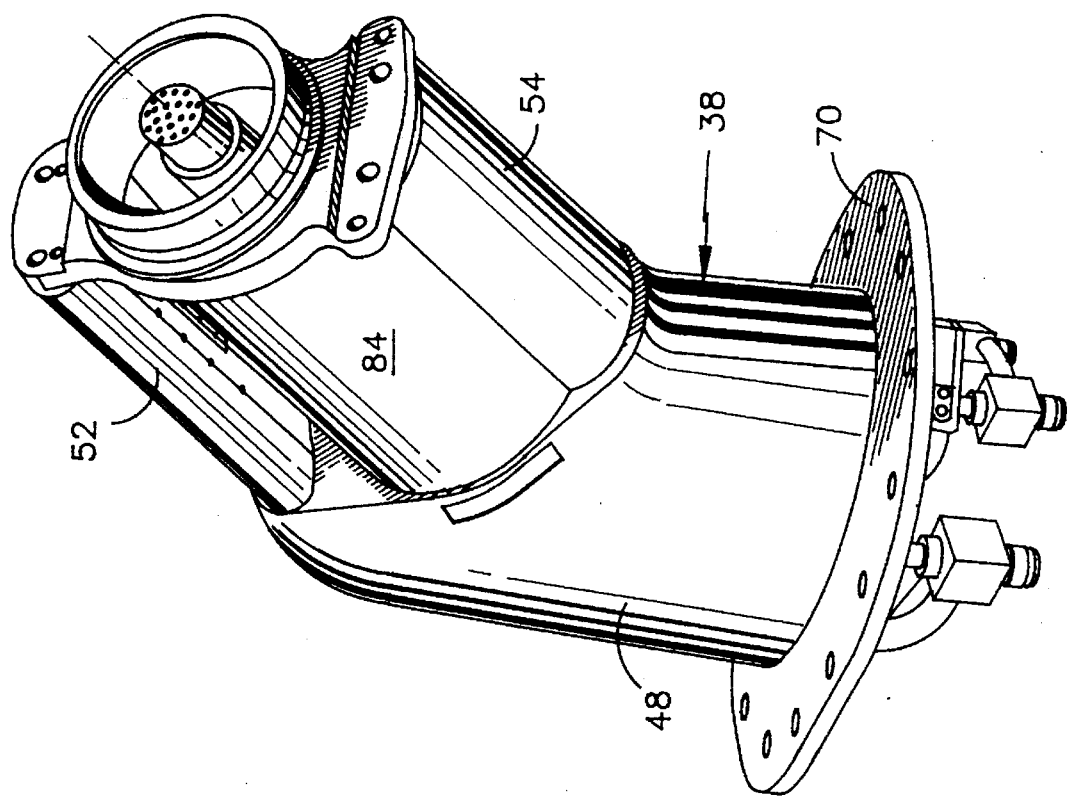
FIG. 6 is another illustration of the pressure vessel support supporting the low NO$_x$ fuel nozzle secured to the support structure.

FIG. 5 is an illustration of the low NO$_x$ fuel nozzle 40 shown broken away and attached to the pressure vessel support structure 38. The low NO$_x$ fuel nozzle includes a center body cone 78 with its base 80 towards the upstream end of the chamber 58 and its apex 82 towards the outlet end of the chamber. The substantially oval chamber 58 is formed by two semi-oval walls 84,86 each having its axis offset from one another and attached to a respective one the distribution manifolds 52,54 to form slots through compressed air enter the chamber. FIG. 6 is another illustration of the pressure vessel support structure 38 with the assembled low NO$_x$ fuel nozzle 40 secured to the support structure 38 which more particularly shows the tangential entry slot through which the compressed air enters the nozzle assembly 40.

Although the present invention has been shown and described with respect to a preferred embodiment thereof, it should be understood by those skilled in the art that various other changes, omissions, and additions may be made to the embodiments disclosed herein, without departing from the spirit and scope of the present invention.

We claim:

1. A pressure vessel support structure for a low NO$_x$ industrial gas turbine engine which receives a fuel line and supports a low NO$_x$ fuel nozzle, the support structure comprising:

a flanged base which connects to the casing of the gas turbine engine;

an elbowed oval vessel which forms an interior cavity through which the fuel line runs, and which is connected at its base to said flanged base and includes an outer downstream end having a mount support structure to which the low NO$_x$ fuel nozzle is attached, said fuel line being isolated from engine air; and a fuel distribution manifold, attached to said elbowed oval vessel at said outer downstream end of said oval vessel, which connects to the fuel line and delivers fuel through a lengthwise passage to a plurality of outlet ports where the fuel exits said manifold.

2. The pressure vessel support structure according to claim 1 wherein said flanged base, said elbowed oval wall and said distribution manifold are formed from a single piece of nickel alloy.

3. The pressure vessel support structure according to claim 1 wherein said flanged base, said elbowed oval wall and said distribution manifold are each separate components made of nickel alloy.

4. An integral pressure vessel support structure for a low $NO_x$ industrial gas turbine engine which receives a fuel line and supports a low $NO_x$ fuel nozzle, the integral support structure comprising:

a flanged base which connects to the casing of the gas turbine engine;

an elbowed oval vessel which forms an interior cavity through which the fuel line runs, and which is connected at its base to said flanged base and includes an outer downstream end having a mount support structure to which the low $NO_x$ fuel nozzle is attached, said fuel line being isolated from engine air; and a plurality of fuel distribution manifolds, each attached to said elbowed oval vessel at said outer downstream end of said oval vessel, which connects to the fuel line and delivers fuel through a passage to a plurality of outlet ports where the fuel exits said manifold and enters a nozzle chamber.

5. The integral pressure vessel support structure according to claim 4 wherein each of said plurality of manifolds connects to a liquid fuel line and a gas fuel line.

6. The integral pressure vessel support structure according to claim 4, wherein said plurality of manifolds are substantially equally spaced around the circumference of said outer downstream end of said pressure vessel.

7. The integral pressure vessel support structure according to claim 6, wherein each of said plurality of fuel distribution manifolds includes a plurality of fuel passages for delivering liquid and gas fuel.

8. The integral pressure vessel support structure according to claim 7 wherein said flanged base, said elbowed oval wall and said plurality of distribution manifolds are each made of nickel alloy.

* * * * *